United States Patent [19]
Comerford et al.

[11] Patent Number: 5,963,671
[45] Date of Patent: Oct. 5, 1999

[54] ENHANCEMENT OF SOFT KEYBOARD OPERATIONS USING TRIGRAM PREDICTION

[75] Inventors: Liam David Comerford, Carmel, N.Y.; Thomas Allan Corbi, Sherman, Conn.; John Peter Karidis, Ossining; William Dennis Strohm, Stormville, both of N.Y.

[73] Assignee: International Business Machines Corporation, Armonk, N.Y.

[21] Appl. No.: 08/911,767

[22] Filed: Aug. 15, 1997

Related U.S. Application Data

[60] Continuation-in-part of application No. 08/493,426, Jun. 22, 1995, Pat. No. 5,724,449, which is a division of application No. 07/799,586, Nov. 17, 1991, abandoned, and a division of application No. 08/232,855, Apr. 25, 1994, Pat. No. 5,479,536.

[51] Int. Cl.$^6$ .................................................. G06K 9/72
[52] U.S. Cl. ............................................ 382/230; 345/168
[58] Field of Search ........................... 382/230; 345/156, 345/163, 168, 170, 173, 176

[56] References Cited

U.S. PATENT DOCUMENTS

| | | | |
|---|---|---|---|
| 4,559,598 | 12/1985 | Goldwasser et al. | 345/173 |
| 5,479,536 | 12/1995 | Comerford | 382/230 |
| 5,524,201 | 6/1996 | Shwarts et al. | 345/326 |
| 5,557,300 | 9/1996 | Satoh | 345/168 |
| 5,736,976 | 4/1998 | Cheung | 345/168 |

*Primary Examiner*—Christopher S. Kelley
*Attorney, Agent, or Firm*—Robert P. Tassinari

[57] ABSTRACT

The most likely to be used characters and controls of a soft keyboard are determined from consulting trigram tables, and enhanced and/or positioned to attract the user and to facilitate quick recognition and selection. The letters and other characters of the soft keyboard display can be arranged in a standard keyboard format, some variation of that format such as a Dvorak layout or an entirely different arrangement such as strings of letters and numbers in alphabetical and numerical order. However, regardless of the layout, an attractant, such as color intensity, or size, is used for emphasis to make a soft keyboard user cognizant of the location of the subset of characters that the user is most likely to select to standout from the other keys of the keyboard. In addition to enhancing all characters of the subset, particular emphasis can be placed on the most likely character in the subset to be selected. Where the most likely character is a letter, duplicates of other letters of the subset, symbols identifying control functions for selection, and probable multiletter combinations, including full words and word endings, can be clustered around that most likely to be selected letter to facilitate quick selection.

40 Claims, 11 Drawing Sheets

Initial Frequency Table Block

| | UN |
|---|---|
| a | 365 |
| b | 7 |
| c | 1281 |
| d | 4788 |
| e | 475 |
| f | 132 |
| g | 57 |
| h | 5 |
| i | 2207 |
| k | 28 |
| l | 103 |
| m | 6 |
| n | 107 |
| o | 6 |
| p | 79 |
| q | 2 |
| r | 29 |
| s | 134 |
| t | 3956 |
| u | 31 |
| w | 6 |

410 → (table); 420 → t row; 418 → 3956

Initial Prediction Table Block

Subsequent Frequency Table Block

| UN | |
|---|---|
| a | 365 |
| b | 7 |
| c | 1281 |
| d | 4788 |
| e | 475 |
| f | 132 |
| g | 57 |
| h | 5 |
| i | 2207 |
| k | 28 |
| l | 103 |
| m | 6 |
| n | 107 |
| o | 6 |
| p | 79 |
| q | 2 |
| r | 29 |
| s | 134 |
| t | 3956 — 418 |
| u | 31 |
| w | 6 |
| 526 — z | 1 — 528 |

514 ↗

Subsequent Prediction Table Block

ENHANCEMENT OF SOFT KEYBOARD OPERATIONS USING TRIGRAM PREDICTION

1. RELATED INVENTIONS

This application is a continuation-in-part of application Ser. No. 08/493,426 filed Jun. 22, 1995, now U.S. Pat. No. 5,724,449 which is a divisional of application Ser. No. 07/799,586 filed Nov. 17, 1991 and now abandoned. Application Ser. No. 08/232,855, filed Apr. 25, 1994, which issued into U.S. Pat. No. 5,479,536 on Dec. 26, 1995, is also a divisional of the abandoned application.

2. TECHNICAL FIELD

The present invention relates to entering data into a computer system and more particularly, to a system and method for entering data into a computer system using a pointing device such as a stylus or mouse.

3. BACKGROUND

Computers which accept commands through operations performed with pointing devices are becoming commonplace. Pointing devices include but are not limited to "mice" and stylus-addressed digitizing tablets which can be used with, for example, a pen-like writing instrument or the user's finger.

One approach to translate data entered with a pointing input device into machine-interpretable codes is a "soft" keyboard. The soft keyboard is typically implemented by using a dialogue box which displays an image of a keyboard and responds to user interaction with that image. Interactions are accomplished using "pointing" devices such as digitizing tables, touch screens, or computer mice. The user may enter characters by pointing to, and "poking", the desired key in the image. Because character selection is explicit with this technique, data entry tends to be highly accurate. In the past, data entry, using prior art soft keyboards, has been a slow process because the user must first locate the desired "key", and then move the pointer to that key. (The soft keyboard does not permit the user to have multiple fingers positioned for future strokes while the current user selection action is being entered, as does a real, physical keyboard.) Thus, prior art soft keyboards are not well suited for applications which require a substantial amount of data entry.

To overcome the above shortcomings of soft keyboards, a modified machine user interface is provided by the above mentioned U.S. Pat. No. 5,479,536, entitled "Stroke Syntax Input Device (the disclosure of which patent is hereby incorporated by reference). The user interface described in this patent is one which the user can interact with naturally; has a display presentation which does not require an excessive amount of space, and is more suitable than the user handwriting in characters as a means of their entry. This modified machine user interface employs trigram data and displays only those characters most likely to be selected next by the user. It formats the presentation of those characters, and interprets the user's pointing device-entered strokes to cause characters to be selected, de-selected or to cause the characters making up the presentation to be changed.

While such a device proved to be a highly efficient way of entering alphanumeric data, it proved to be disconcerting to certain users who preferred to have a display of the full keyboard for character selection and entry.

BRIEF DESCRIPTION OF THE INVENTION

In accordance with the present invention, advantages of the trigram prediction element of user selection action syntax input devices are obtained for a displayed soft keyboard. The most likely to be used characters and controls of the soft keyboard are determined from consulting trigram tables, and their presentation graphically enhanced and/or positioned to attract the user and to facilitate quick recognition and selection. The letters and other characters of the soft keyboard display can be arranged in a standard keyboard format, some variation of that format such as a Dvorak layout or an entirely different arrangement such as strings of letters and numbers in alphabetical and numerical order. However, regardless of the layout, an attractant, such as color, intensity, or size, is used to make it easier for a soft keyboard user to find the location of the subset of characters that the user is most likely to select.

In addition to enhancing all characters of the subset, particular emphasis can be placed on the most likely character in the subset to be selected. Where the most likely character is a letter, duplicates of other letters of the subset, symbols identifying control functions for selection, and probable multiletter combinations, including full words and word endings, may be displayed in a cluster around the most likely to be selected letter to facilitate quick selection. Furthermore, where a differential (rather than absolute) pointing device, such as a mouse, is used, the cursor can be stationed in to the proximity of the most likely letter selection to add emphasis and speed character entry. As the letter selection progresses, the database of letters used to make predictions about the set of letters most likely to be chosen next, is updated to include the letters actually selected.

Therefore is it an object of the present invention to provide an enhanced soft keyboard.

It is another object of the present invention to provide an enhanced soft keyboard that incorporates the advantages of trigram character prediction.

BRIEF DESCRIPTION OF THE DRAWINGS

The foregoing and other objects, features and advantages of the invention will be apparent from the following more particular description of preferred embodiments of the invention, as illustrated in the accompanying drawings.

FIGS. 9 and 10 show an example of how prediction tables are constructed from, and maintained with, frequency tables.

DETAILED DESCRIPTION OF THE INVENTION

1. Displays

Figure 1:
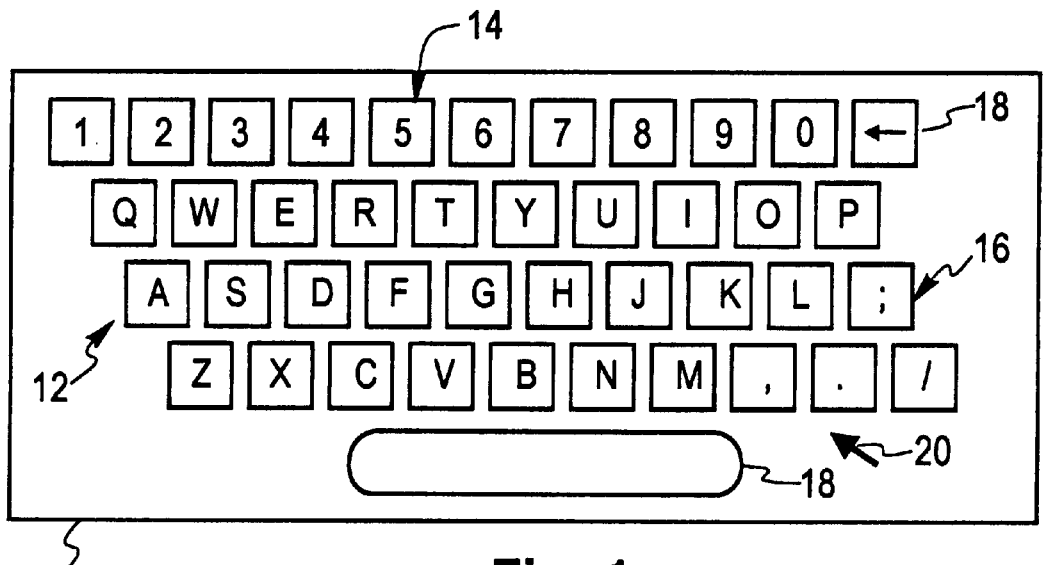
FIG. 1 is a plan view of a prior art "qwerty" soft keyboard layout.

As shown in FIG. 1, the standard Qwerty keyboard layout 10 contains a representation of the keys for letters 12, numerals 14 and punctuation 16 and control keys 18. In a soft keyboard selection of any "key" using a mouse 20 or other selection means, results in the creation of a keystroke message which is a representation of that letter. In the keyboard of FIG. 1, all symbols on the keyboard are similarly presented in that their size, line weight and the nature of their border are the same. With such an arrangement, it is difficult for an operator to pick out the desired symbol from the forty odd symbols on the keyboard. As a result, entry of messages turns out to be tedious, tiresome and time consuming.

Figure 2:
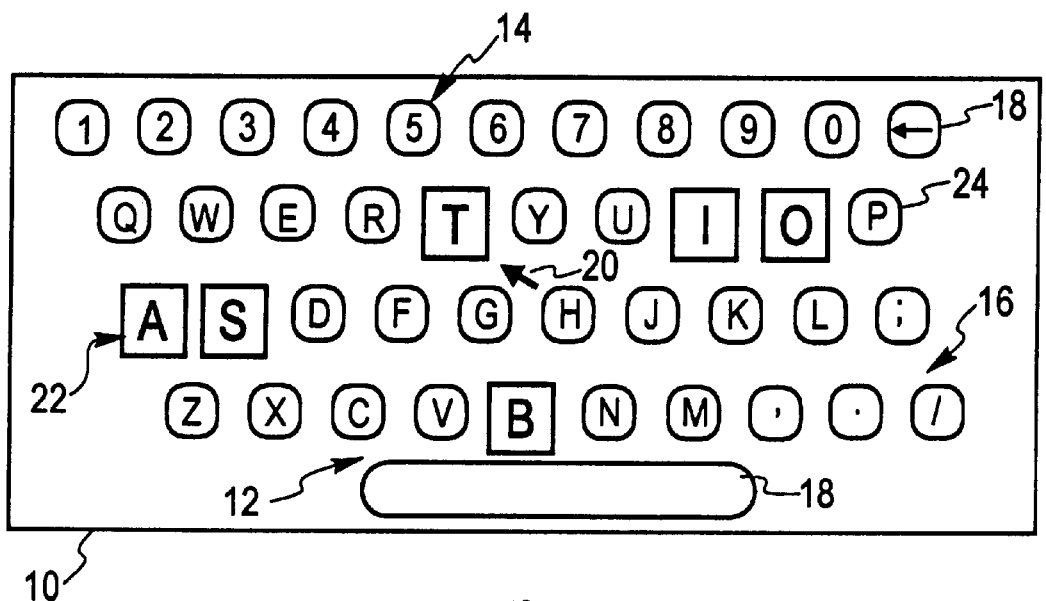
FIG. 2 is a plan view of a "qwerty" soft keyboard layout in accordance with the present invention.

In accordance with the present invention, characters most likely to be selected are emphasized in various ways to bring them to the foreground so they may be found quickly by the operator. As shown in FIG. 2, six of the letters are emphasized by means of size, line weight, and the character of their border to aid in their location by the soft keyboard user. These are statistically the six most likely of the letters of the alphabet to be requested by the user when writing a relatively long message.

Where, as in the case of FIG. 2, the user is at the start of a word the six statistically most likely letters to be requested by the user are t, i, a, s, o, b in that order. These six letters are presented in larger, bolder type face than the other characters of the keyboard. Further, the "keys" of those six are represented here as angular boxes 22 while the keys for the remainder of the characters are illustrated as boxes 24 with rounded corners. Where a mouse is used, the cursor 20 is presented in the proximity of the most likely letter to be chosen (in FIG. 2, the letter t) to add additional emphasis to the most likely letter and to save time in its selection.

Figure 3:
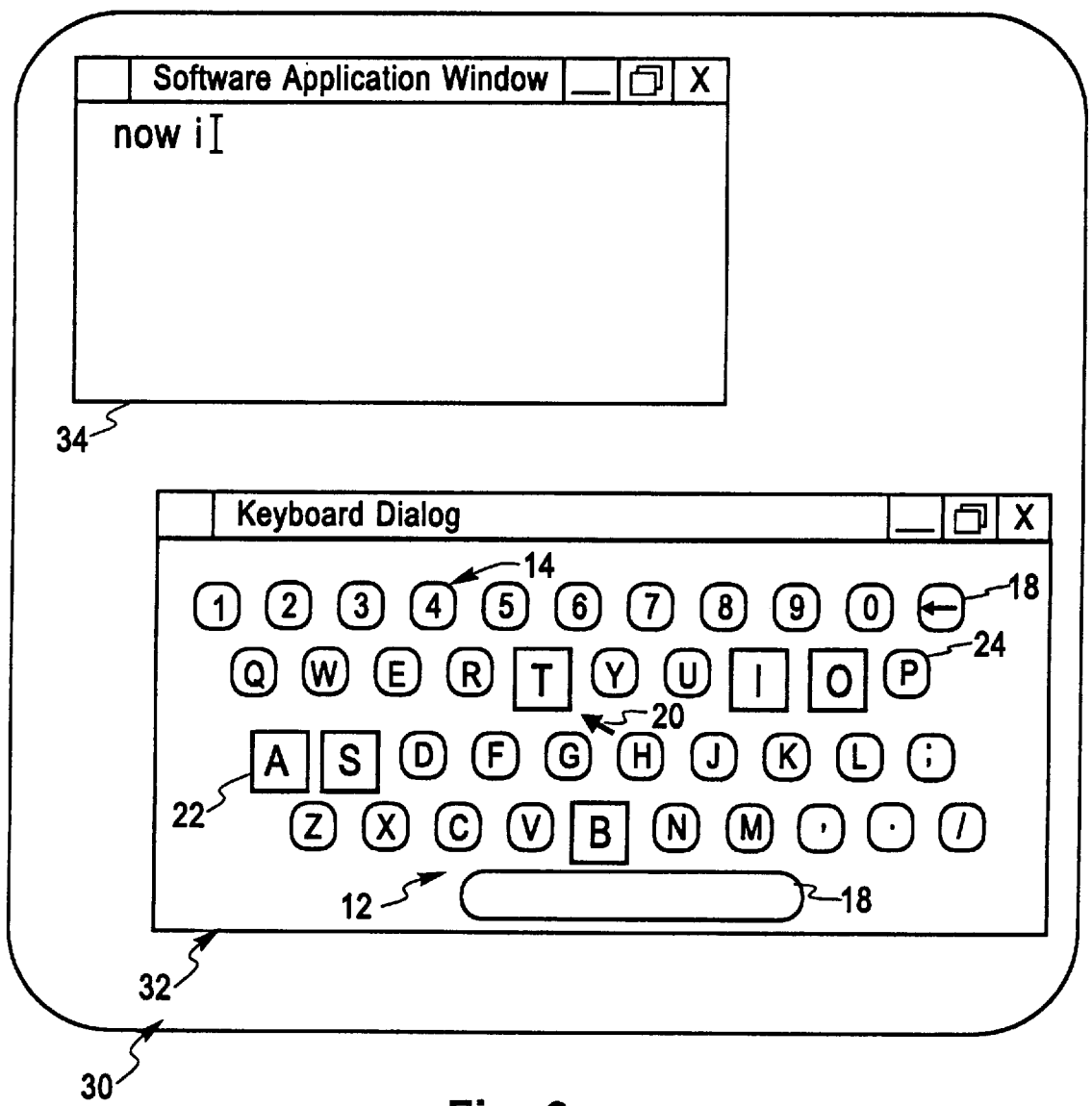
FIG. 3 is plan view of a computer soft keyboard display using the soft keyboard layout disclosed in FIG. 2.

To select any letter, either one of the letters in the set of six emphasized letters or one of the unemphasized characters of the keyboard, the mouse is moved to place the cursor in the close vicinity of the desired character and depressed. Such a selection of any key using a mouse or other selection means, results in creation of a keystroke message representative of that character. As shown in FIG. 3, this message, which is a typical Windows (TM) WM-CHAR message, is received by the message queue for the software application window 34 and processed in order to display, in the application window 34, the selected character or other perform any function that the message requests. This form of processing is exactly the same as for hardware keyboard messages and is well understood by those of ordinary skill in the art.

In FIG. 3, the emphasized characters are the same as those shown in FIG. 2 because like FIG. 2, the user is about to start a new word. However as each letter is selected, the six letters emphasized by the angular boxes 22 can change to reflect the changes in probability. For instance, if "t" is selected as the first letter of a note, it is less probable that "t" would also be the second letter of the note. It is most likely that an "o" would be the second letter selected. Therefore, the cursor 20 would shift to the letter "o". Similarly, the other letters to be emphasized would change to reflect the change in probability of usage. For instance, it is highly unlikely that an "s" or a "b" would appear after a "t" has been selected as the first letter of a message. Therefore, the emphasis placed on "s", "b" and "t" would be removed and placed on different letters in the alphabet. It is important to note that the number of characters to be emphasized and their degree of emphasis may change as a function of the data found in the prediction table.

In the present embodiment of the invention, the change in probabilities is determined by consulting trigram tables. The entries of trigram tables are based on the probability of a letter being selected under conditions that takes into account the previous two selections made by the user. Other tables that reflect frequency of selection can be consulted for this purpose. For instance, bigram tables which take into account the last entry or quadram tables that take into account the previous three selections could be used. Trigram tables are selected over tables having more or less byte positions as a compromise between accuracy of the predictions and table size. This choice could change with changing technology.

It is worth, at this point, discussing the structure of trigram tables in order to make clear how these tables are first constructed and then consulted.

Constructing a trigram table which is of sufficient power to be useful for predicting next characters, requires that a large body of text be analyzed for "trigram frequencies". The trigram frequency table is then used to construct "trigram prediction" tables. The trigram prediction tables can then be used to predict the characters which are most likely to follow any pair of characters in text. The prediction works best if the text the tables were made from is the same sort of text as the predictions are being made for. These three processes: preparing a frequency table, preparing a prediction table, and making predictions, are illustrated below.

While the accuracy of trigram tables relies on a "large body of text", a single sentence without capitals, numbers or punctuation can be used to illustrate the process:

this sentence is the body of the text

The set of trigrams in the sentence can be found breaking the sentence into each of its sets of three sequential letters (letter trigrams). In the case of our illustration sentence, these letter trigrams are:

```
-- t -th thi his is- s-s -se sen ent nte ten enc nce
ce- e-i -is is- s-t -th the he- e-b -bo bod ody dy- y-o -of of-
f-t -th the he- e-t -te tex ext xt- t--
```

Each dash represents a "space" character so the first and last trigrams use two spaces to fill out the structures.

The trigram frequency table is made by alphabetizing the triads and counting the number of times each trigram appears. This is shown below:

```
--t, 1; -bo, 1; -is, 1; -of, 1; -se, 1; -te, 1; -th, 3; bod,
1; ce-, 1; dy-, 1; e-b, 1; e-i, 1; e-t, 1; enc, 1; ent, 1; ext,
1; f-t, 1; he-, 2; his, 1; is-, 2; nce, 1; nte, 1; ody, 1; of-,
1; s-s, 1; s-t, 1; sen, 1; t--, 1; ten, 1; tex, 1; the, 2; thi,
1; xt-, 1; y-o, 1
```

Trigram prediction tables are constructed from trigram frequency tables as follows:

A trigram character prediction table is a three dimensional array. Each element of the array is a character. That character can be "found" by specifying its three indices in the array. Since the array indices are integers, and the text a person is constructing is composed of character symbols, a conversion must be made from symbol to integer. To make a prediction, the last two symbols that the user entered are to be used as array indices for finding a prediction by simply mapping them into numbers by making a=0, b=1, c=2, . . . z=25, space=26.

When making a trigram character prediction table, the third index is the ordered likelihood of the character that will be found at that position in the array.

In our limited example, the trigram "-th" has the highest frequency (3). The characters "-" and "t" map into the numbers (26, 19). The complete array coordinates for the most likely character to be found following "-t" are (26, 19, 0). When making the prediction table, the character "h" is placed at that position. Since no other data for characters following "-t" are available in this example, the remaining spaces in that part of the array ((26, 19, 1) (26, 19, 2) . . . (26, 19, 26)) may be filled in alphabetical order or in the general monogram frequency order for the language. Such monogram frequency orders may be found easily by examining a large body of text or using a reference work in cryptography.

Once the prediction table is filled, a soft keyboard may find the most likely keys by consulting the array elements indicated by the mapped-preceding letters, and the ordered likelihood of the desired characters.

The number of characters to be emphasized can be chosen by first finding how many entries exist (for a given pair of predicting characters) in the frequency table, and then applying some designer selected policy (such as six maximum) to that number.

Figure 4:
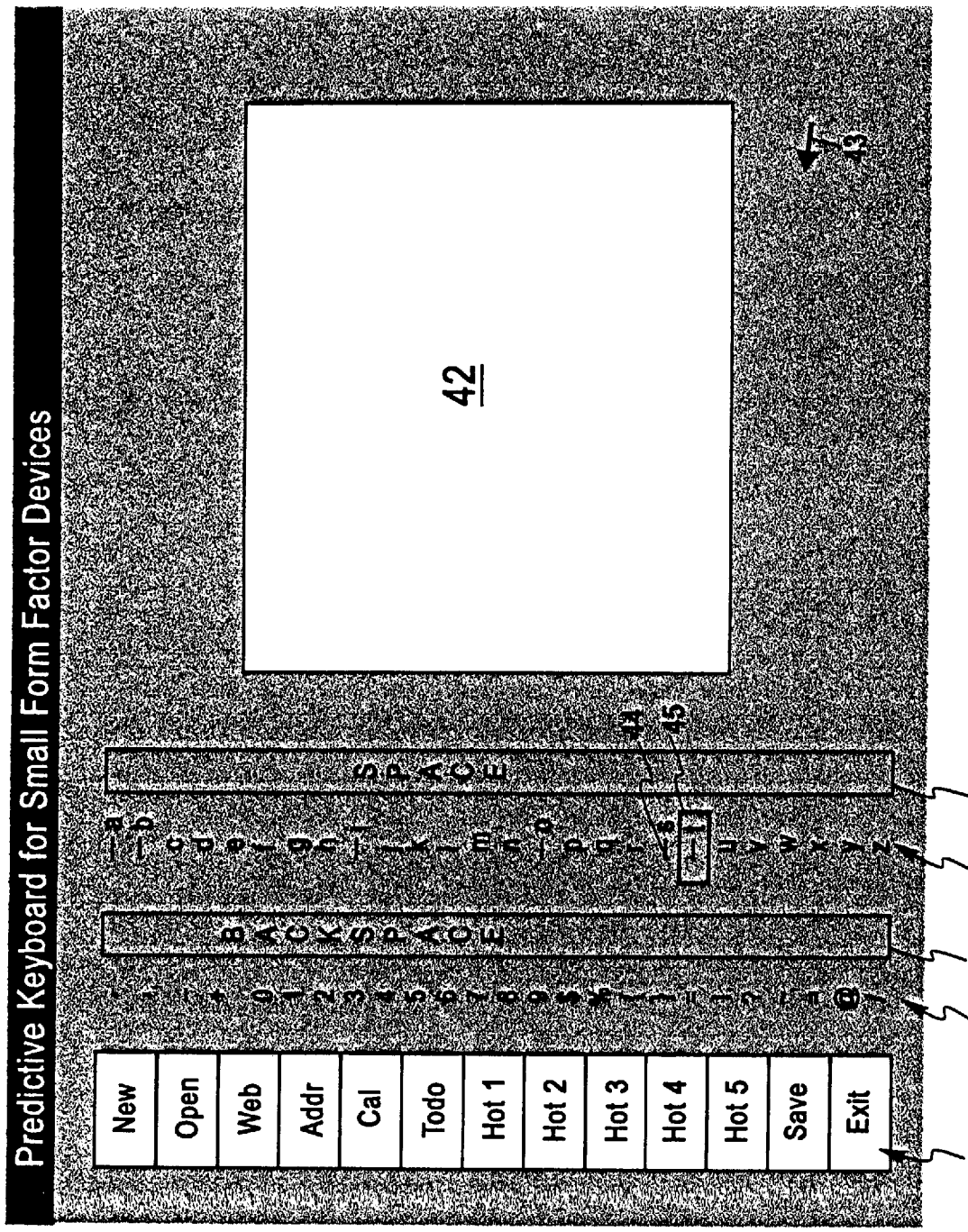
FIGS. 4 and 5 are plan views of an alternative form of a computer soft keyboard display in accordance with the invention.
Figure 5:
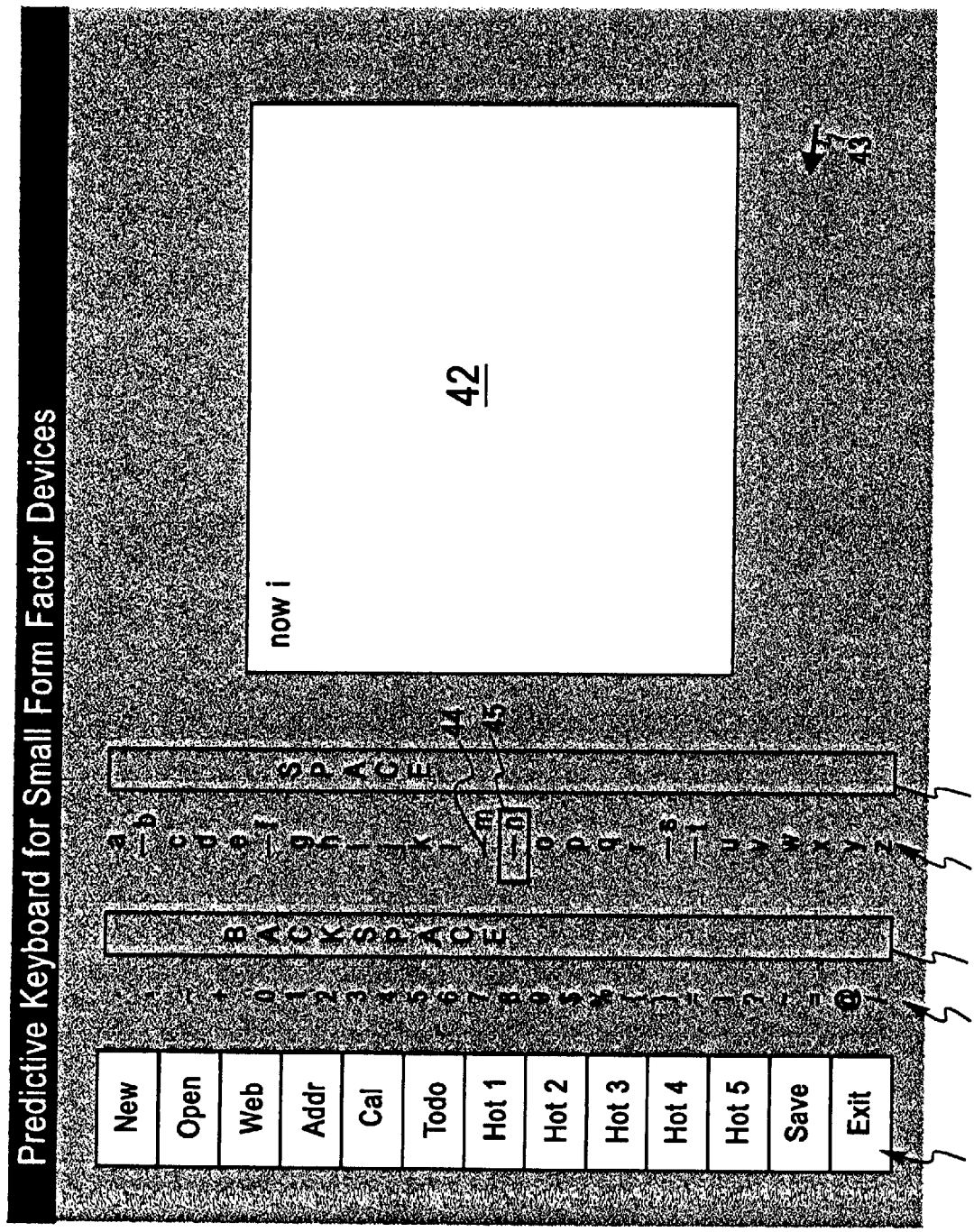

A second soft keyboard arrangement is shown in FIGS. 4 and 5. There, six of the letters are not aligned with the other letters in column 40. These letters are statistically the six most likely of the letters of the alphabet to be requested by the user. This misalignment is to aid in the location of letters by the user. Where, as shown here and in FIG. 2, the user is at the start of a word, the six statistically most likely letters to be requested by the user are t, i, a, s, o, b in that order. The letter t being the most likely of all the letters appears in a box 45. If the cursor 43 is not near any selection, all the user has to do is depress the left hand key of the mouse to select the letter t. Otherwise, to select any letter, either in one of the letters in the set of six emphasized by the dashed lines 44 or one of the unemphasized letters, the mouse is moved to place the cursor in the close vicinity of the desired letter and depressed. This is an example of the "clustering" speed enhancement mentioned earlier.

A space bar 46 is positioned to the right of the alphabet column 11. Selection of the space bar 46 with the mouse advances the selected position without selection of a character thus leaving an empty space on the message segment 42, such as the space between the "w" and "i" in FIG. 5. To the left of the letters 41 is a backspace bar 47 that permits reversing the progress of writing the message for editing. For instance in FIG. 5, the backspace bar 47 could be selected three consecutive times to place the writing position in the location of the "w" in the message area, and then selecting a "t" to change the message from "now i" to "not i" means for changing from "overstrike" to "insert" modes of operation can be provided as easily on this keyboard as on any other. Similarly, special function keys can be provided.

A column of common non-alphabetic keyboard characters 48, including the numerals 0 to 9, is to the left of the backspace bar 47 for inclusion into the text space 42 and a menu 49 of function blocks appears along the left edge of the screen. Many of the function blocks are self explanatory; "NEW" is to start a new message, "OPEN" is to open a message resident in the computer, "EXIT" is for ending a session, and "SAVE" is to retain messages in storage. Other of the items, represented by the blocks, may not be so apparent. For instance, "WEB" is to initiate access to the internet; "CAL" is to perform calculations on an image of a hand held calculator that appears in the message area when CAL is selected: and "TO DO" brings up a calendar in the message area 42 for reference or modification. "HOT 1" to "HOT 5" are selectable functions to be programmed by the operator. Selection of certain functions on the menu such as Hot 1 to Hot 5 that will modify the menu or bring up a substitute menu are well known by those skilled in the art.

Figure 6:
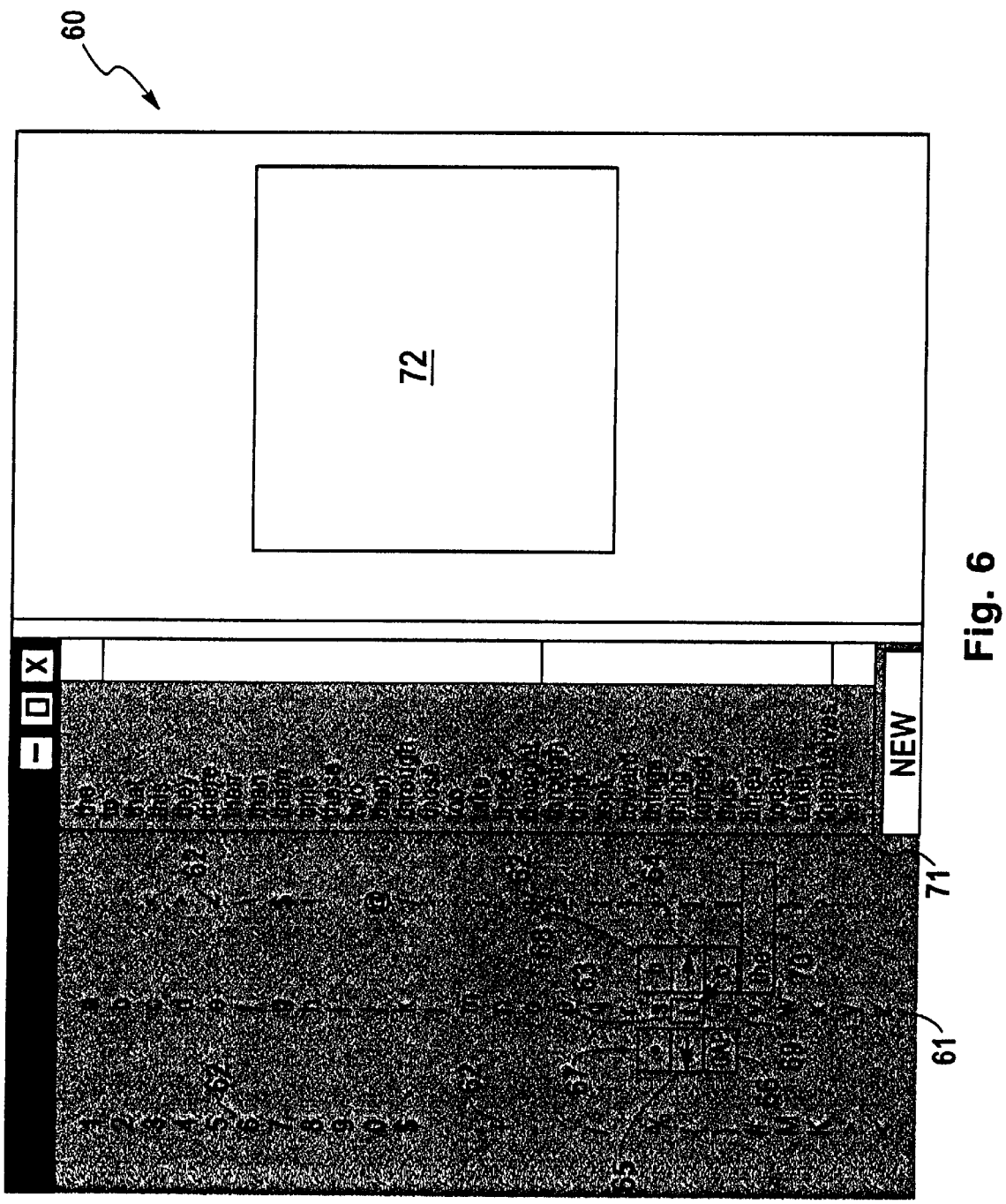
FIG. 6 is a plan view of another alternative form of a computer soft keyboard display of the present invention.

Another alternative form of presentation 60 of information using the format similar to that of columnar arrangement contained in FIGS. 4 and 5, is shown in FIG. 6. This embodiment has a column 61 of the letters, a to z situated between two other columns with other selectable characters 62. The six most likely letters to be selected, "a", "b", "i", "o", "s" and "t", are darkened to attract the users attention to them. Like the embodiment in FIG. 4 and 5, the most likely letter to be needed, "t", is enclosed within a rectangle 63. Positioned around the rectangle 63 are other rectangles containing likely choices. On either side of the rectangle 63 are rectangles 64 and 65 for the forward and backspace bars, respectively. Below the rectangle for the backspace bar, there is the capitalization select rectangle 66, and above the rectangle for the backspace bar is the period "." selection rectangle 67. The two most likely letters to be selected after "t", the letters "h" and "o", are contained in rectangles 68 and 69, positioned above and below the rectangle 68 for the space bar. A rectangle 70 below rectangle 68, contains the word "the" which is the most likely word beginning with a "t". The display also contains a rectangle 71 with list of words beginning with the letter "t" that are likely to be selected.

As long as focus remains in the box 63 in the column 61 (as the user moves that cursor up or down the letter column 61 ), the collection of the frequent choice letters and punctuation rectangles (63, 67, 65, 66, 68, 64, 69, 70 ) follows along (as if magnetically attracted) with the next two most likely predicted letters (e.g., 68 and 69 ) and most likely word (e.g., 70 ) changing dynamically. If the user selects the letter in box 63 in the normal manner of clicking of the left mouse button (or equivalent), then the cursor is automatically moved to the lower right corner of box 68 (this being the most likely next letter). Should the user select either box 68 or 69, then the whole collection of squares (63, 67, 65, 66, 68, 64, 69, 70 ) jumps to the next most frequent letter position in column 61. As in FIGS. 4 and 5, the five most likely letter choices are called to the users attention by boldface in column 61 and change as each letter is selected. The collection of rectangles "wraps" vertically so if the user positions the cursor below the "z" position in column 61 then the focus for 63 is thrown to the "a" position in column 61. And, similarly, should the user position the cursor above the "a" position on column 61, the collection is thrown to the bottom of column 61 onto the "z" position. Should a space (64), a period (67), or word (70) be selected, then the cursor and collection are returned to the default "start new word position". In this embodiment, the start new word position is "t".

Should the real cursor arrow leave the letter column 61 (and not be positioned on any of the rectangles in the collection), then the predictive collection vanishes and the cursor moves to the numeric column or the special character column or to the word column 71. Should a selection in the numeric, special character or word column be made, then the cursor is automatically thrown to the "start new word position".

Selection of box 63 adds a "t" to the text in text display area 72, and the configuration of rectangles 63 to 71 will move to be centered around the letter "a" the next mostly likely letter to be selected after the letters "h" and "o". Selection of box 67 selects the letter combination "th". While selection box 68 selects the duo "to", and selection of box 70 selects the word "the", and selection of any word in the column 71 selects that word for the message. Selection of box 66 prior to any selection in boxes 63 and 67 to 47 and in column 71 capitalizes the letter "t" or the first letter in the selected word or word request.

With each selection, the characters in the rectangles 63 and 65 to 70 and in the column 71 is adjusted to reflect the probability of their selection next by the user. The backspace bars 64 and 65 remain constant in their respective positions on either side of the most likely to be selected letter, whether it be "t" or any other letter. If the user wishes a letter other than the one in the box, the user may move the box 63 to encompass the desired letter using the mouse. As the box 63 moves the other boxes move with it with the letters and the words in the boxes 67 to 70 and column 71 changing with the movement to express the probabilities of the elements contained in those boxes being selected.

The display 60 lacks the function menu of the embodiment of FIGS. 4 and 5. However, it should be understood that the menu 48 can be placed, as shown in FIG. 4, to the right side of the columns of the display in FIG. 6. Further, if space is at a premium, certain of the columns may be eliminated, such as the word table 71, and the character 62 columns, and the test space 72 for the message can be minimized.

2. System Overview

Figure 7:
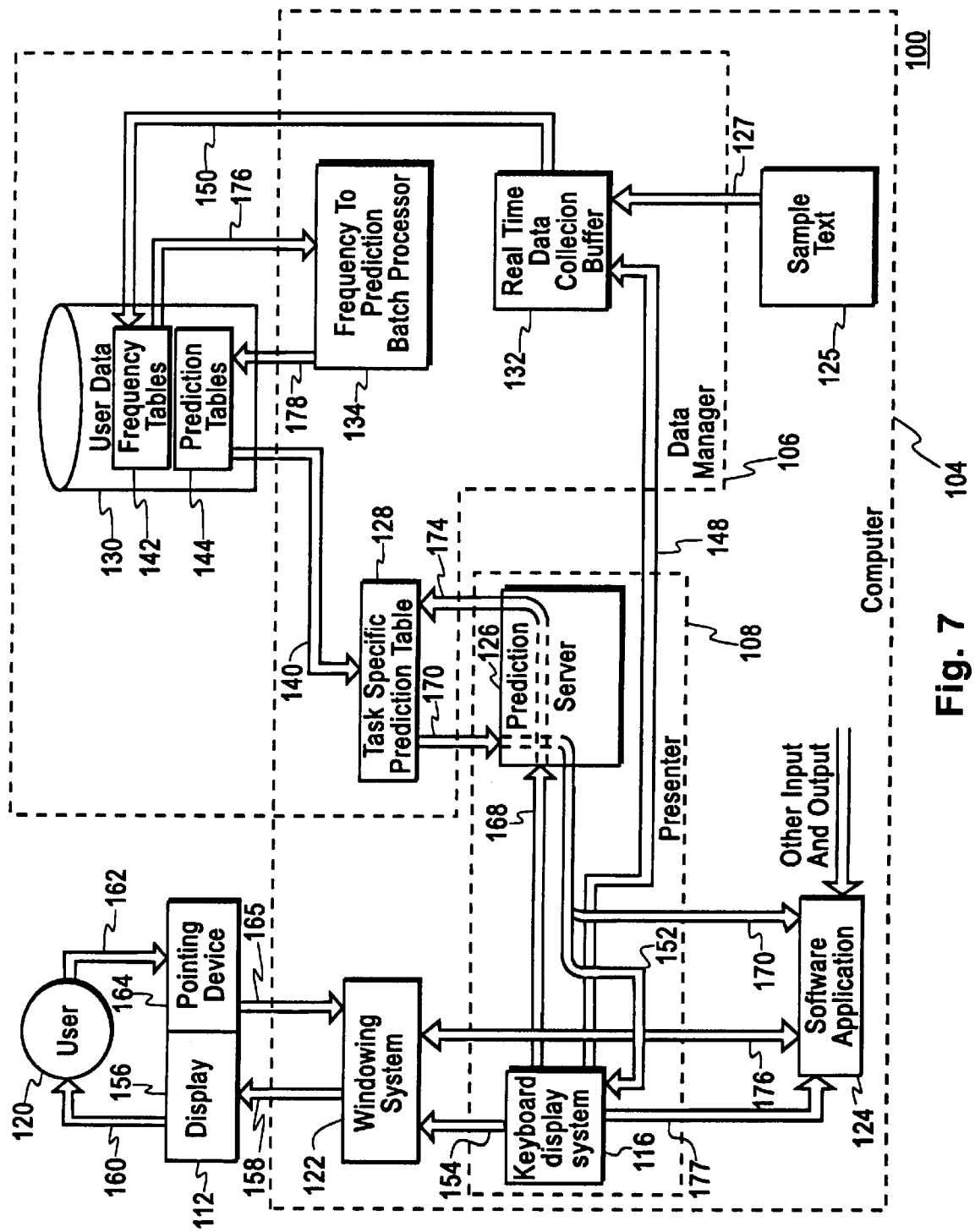
FIG. 7 is a block diagram of a system which is applicable to the soft keyboard layouts of the present invention.

Referring now to FIG. 7, a soft keyboard input device 100 includes a soft keyboard display 156, such as one of those described in connection with FIGS. 2 to 6. The input device 100 comprises a data manager 106 and a presenter 108. The data manager 106 and presenter 108 interact with a user 120, a windowing system 122, a software application 124, and a user interface system 112. In the case that all applications can be addressed by the keyboard, the software application 124 is an extension to the operating system. The user interface system 112 comprises the previously mentioned display 156 and a pointing device 164.

The data manager 106 comprises a real-time data collection buffer 132, a frequency-to-prediction batch processor 134, on-line frequency tables 142, on-line task specific prediction tables 144, and a memory-resident task specific prediction table 128. The presenter 108 comprises a prediction server 126, and keyboard display system 116.

The above-listed components of the data manager 106 and the presenter 108 (excluding the frequency tables 142 and the prediction tables 144 ) are software modules which are executed by a general purpose computer 104. It should be understood by those skilled in the art that although these modules could be implemented with "dedicated hardware", economy and availability dictate that a software implementation is to be preferred. It should also be understood that, to one skilled in the art, other partitions or function topologies can be implemented without departure from the spirit of the invention.

The data manager 106 and presenter 108 modules will be described briefly below and in more detail thereafter.

The frequency tables 142 indicate the number of times particular sequences of options have occurred in an input text. As pointed out previously, the sequences are called trigrams. The sequences could also be made up of two options or other fixed or variable number of options as permitted by computing resources or dictated by application requirements. In the example described below, options are characters. However, they are also the operating system commands and multiple character combinations, such as the partial and complete words that occur in the embodiments of the invention.

The real time data collection buffer 132 collects trigrams as source text is entered. Generally, the input text is the text presently being entered by the user 120. Alternatively, a sample text 125 could be decomposed into trigrams and sent to the real time data collection buffer 132 (via a path 127 ) to create or enhance the frequency tables 142 and the prediction tables 144, or to improve prediction before the user 120 has entered enough data to construct meaningful frequency tables 142 and prediction tables 144. The real time data collection buffer 132 periodically empties itself and, in doing so, updates entities of one of the frequency tables 142. The frequency tables 142 contain integer representations of the number of times the user 120 has entered particular trigrams.

The prediction tables 144 indicate the relative frequency with which the user 120 has entered the trigrams. In cases where trigrams have never been observed by the system, entries for those trigrams will appear in alphabetical order, or monogram frequency order, following entries for trigrams which have appeared and can be ordered by frequency. The frequency-to-prediction batch processor 134 periodically uses the data in the frequency tables 142 to update the prediction tables 144.

To improve prediction, there are different frequency tables 142 and prediction tables 144 for different software applications. Accordingly, upon application initialization, a prediction table for a software application 124 in use is copied from the non-volatile on-line storage device 130 into the computer 104. This prediction table is, thus, a memory-resident task specific prediction table 128.

The prediction server 126 uses the task specific predication table 128 to predict the characters the user 120 will select next. The keyboard display system 116 generates a description of the soft keyboard and application window. The soft keyboard is a full keyboard in the manner described above, in connection with FIGS. 2 to 6, with enhanced predicted characters and operating system command options for selection by the user 120. The windowing system 122 (of which the Microsoft Windows System is a typical example) provides the display management services needed to convert the keyboard description into a screen presentation. The windowing system 122 performs this conversion and writes the presentation on the display 156. Finally, the keyboard display system interprets entries made by the user 120 to cause characters to be selected for entry into the application window, or to cause the keyboard presentation to be changed.

The user's actions with respect to the pointing device 164 (for example a "stylus" or a "mouse") result in a data collection. In case of a stylus, it represents the spatial location at which the stylus was placed in contact with the surface of the soft keyboard display 156. When a "mouse" is used, it represents button "clicking" rather than stylus contact.

Thus, the interaction between the user 120 and the present invention is essentially as follows. When the user 120 addresses the display 156, a keyboard is observed which is associated with some software application or with the operating system. The user 120 operates the stylus, mouse, or other pointing device to select soft keyboard keys through the windowing system services via data path 165, and from there to the application path 176. The character is collected by the keyboard display system, and a new pair of index characters is sent to the prediction server 126 via data path 168. A copy of the stream of selected characters is also forwarded via data path 148 to the real time data collection buffer 132. The content of this buffer 132 is used by the frequency-to-prediction batch processor 134. As a result of the background activity of the frequency-to-prediction batch processor 134, the predictions become more finely tuned to the vocabulary and style of the user 120 in a particular context.

A design objective of the present invention is to make it easy for the user to discern characters of the soft keyboard he or she is likely to select next, comprehend how to select options on the presentation, and physically move the pointing-device so as to select such options. In furtherance of improving prediction, preferred embodiments of the present invention use different frequency and predication tables for different applications.

3. Data Manager

Each of the frequency tables 142 stores numbers reflecting the number of times the user 120 has entered each trigram while using a particular software application. Structurally, each of the frequency tables 142 is a one-dimensional array of entries. Each entry is made up of a trigram field and a frequency field. The frequency is indicative of the number of times the user 120 has entered the trigram.

The real-time data collection buffer 132 comprises an intelligent buffer which maintains the frequency tables 142. The buffer structure is similar to that of the frequency tables 142. The real-time data collection buffer 132 receives entries from the entry analyzer 114 via the data path 148. When sufficiently filled, the real-time data collection buffer 132 updates the frequency tables 144 and empties itself.

Figure 11:
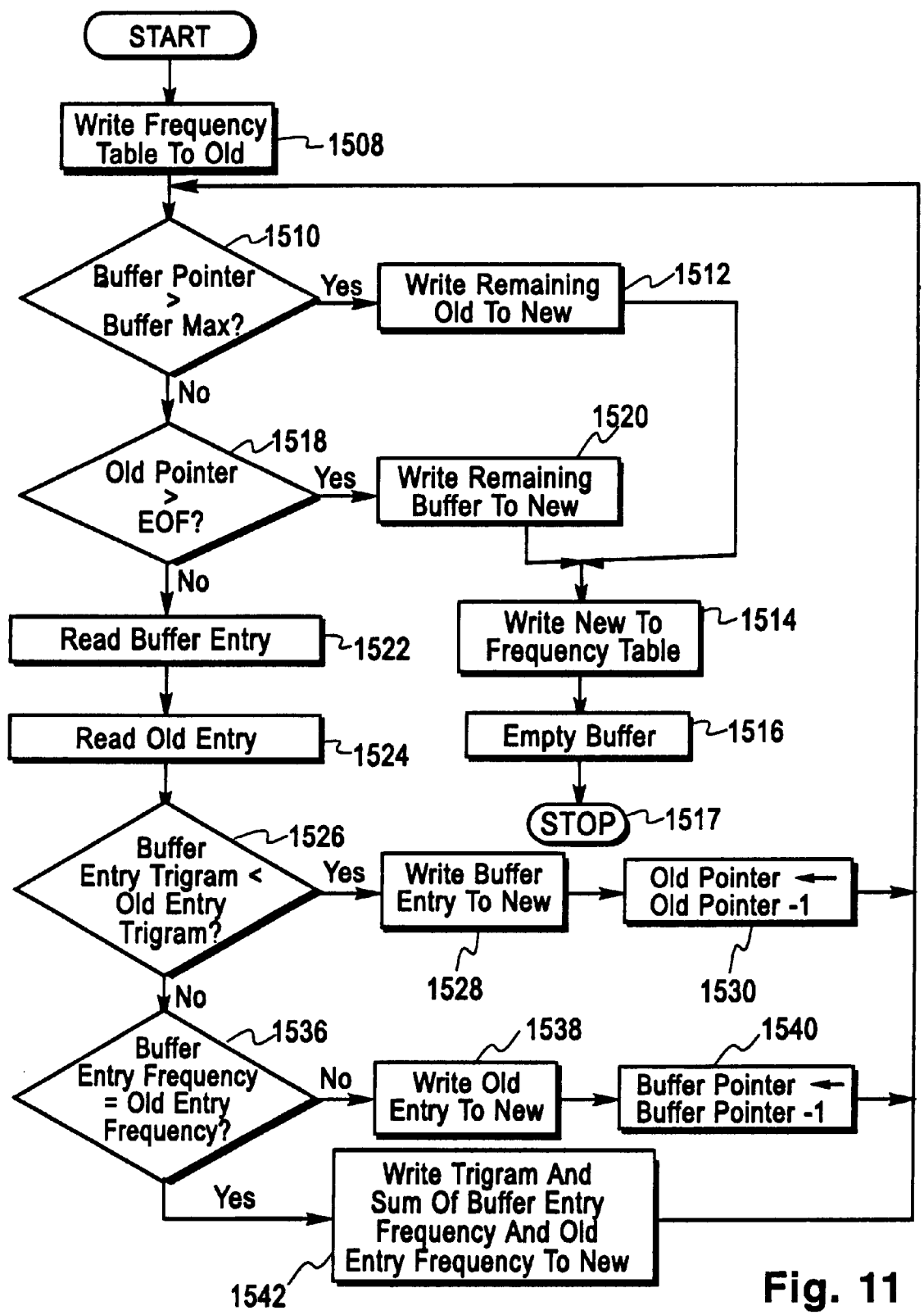
FIG. 11 is a flow chart for the method of operation of the real time data collection buffer of FIG. 7.

FIG. 11 is a flow chart which illustrates the details of the updating and clearing method. The method merges the contents of the real time data collection buffer 132 with the contents of the appropriate frequency table using the two intermediate files called "old" and "new". These files are read from or written to at a file location corresponding, respectively, to the file pointers "old pointer" and "new pointer".

In step 1508, the real-time data collection buffer 132 writes the appropriate frequency table to the old file. In step 1510, the real-time data collection buffer 132 determines whether a buffer pointer used to track frequency table updating is pointing past the end of the real time data collection buffer 142, indicating that all entries in the buffer have been processed.

If all entries in the real time data collection buffer 142 have been processed, in step 1512 the portion of the old file succeeding the old pointer is written to the new file. Then, in step 1514 the new file is written to the frequency table being updated. In step 1516, the real time data collection buffer 132 is "emptied". The real-time data collection buffer 132 then terminates its frequency table updating operation (see step 1517 ).

If the buffer pointer was not pointing past the end of the buffer, then in step 1518 the frequency table updating function of the real-time data collection buffer 132 determines whether the old pointer points past the end of the old file. If so, then all entries of the old file have been processed. Accordingly, in step 1510 the portion of the buffer subsequent to the buffer point is written to the new file. Flow of control then goes to step 1514, which is explained above.

If the old pointer did not point past the end of the old file, then in step 1522 the frequency table updating function of the real-time data collection buffer 132 reads the next entry of the buffer. In step 1524, it reads the next entry of the old file. In step 1526, the real-time data collection buffer 132 determines whether the trigram of the buffer entry precedes the same trigram of the old entry. If so, then in step 1528 the buffer entry is written to the new file. In step 1530, the old pointer is decremented so that the same trigram of the old entry will be compared to the next trigram of the buffer. Flow of control then returns to step 1510, which is explained above.

If in step 1526 the trigram of the buffer entry did not precede the trigram of the old entry, then in step 1536 the real-time data collection buffer 132 determines whether the trigram of the buffer entry equals the trigram of the old entry. If not, then the trigram of the old entry must precede the trigram of the buffer entry. Accordingly, in step 1538 the old entry is written to the new file. Then, in step 1540 the buffer pointer is decremented so that the same trigram of the buffer entry will be compared to the next trigram of the old file. Flow of control then goes to step 1510, which is explained above.

If the trigram of the buffer entry equals the trigram of the old entry, then in step 1542 that trigram and the sum of the frequency of the old entry and the frequency of the new entry are written to the new file. Flow of control then goes to step 1510, which is explained above.

Clearly, in time, the numerical fields of the frequency tables 142 may contain large numbers. Overflow or wrap errors are avoided by having the frequency to batch processor 134 scale the frequency fields either periodically of when some trigram exceeds some threshold value.

The rate at which the predictions adapt to the vocabulary and style of the user 120 will be affected by the method chosen for scaling. A preferred method is carried out as follows. Scaling is triggered on a block of a prediction table when a sum written to the block in step 1542 of FIG. 11 would exceed a predetermined threshold. A block of a prediction table is made up of all entries of the table which have a common first and second index. The threshold could be just less than the largest value representable by the frequency field. Frequencies could be scaled by simply dividing by 2. Note that division by 2 requires little computation time as it is performed with a shift right of one bit.

Frequency field of the frequency tables 142 should be large enough to accommodate a broad range of values. Otherwise, many trigrams will be scaled to the same value, and prediction quality will deteriorate. In preferred embodiments, the frequency fields could have 16 bits of precision. Alternatively, if space were at a premium, they could have 8 bits of precision.

The prediction tables 144, store characters according to the frequency with which the user 120 has selected them. If the computer 104 on which the soft keyboard input device 100 were implemented had adequate memory, each of the prediction tables 144 could store prediction data specific to one particular software application. Structurally, if only characters are to be predicted, and tables are not kept separately for predicting according to the position of a prediction in a word, then each of the prediction tables 144 is a 27×27×27 element array of characters.

Entries of the prediction tables 144 are specified by trigram indices. Generally, each trigram index is made up of three indices. The first two indices (called a preceding sequence) are the positions of the first two characters of the desired trigram in an alphabetical ordering. Thus the indexing character pair "aa" would provide the preceding sequence 1, 1 while "bz" would provide preceding sequence 2,26. Note that a portion of a prediction table indexed by a common preceding sequence is referred to as a prediction block. The third index (called the occurrence likelihood) is the position of any given character in order of declining likelihood. For example, the most likely character to follow "aa" would be stored at location 1,1,1, in the array, the second most likely at 1,1,2, etc., while the third most likely character to follow "bz" would be stored at 2,26,3. This storage structure allows easy retrieval of next character predictions if the two preceding characters are known.

It is very likely that some trigrams will never be observed. In the event that a given trigram is unobserved, it still must be listed in the appropriate prediction table so that in the even the user 120 wishes to enter a character which will cause the first instance of that trigram, the character will be presented. These as-yet-unobserved cases are handled by alphabetized entries in the array. For example, if the trigrams "bcq" and "bcm" were the only trigrams starting with "bc" that were observed in the texts used to make the frequency tables, the "bcq" were the more frequent, then the predictions found at indices 2,3,1 through 2,3,6 would be "qmabcd"; the predictions at indices 2,3,7 through 2,7,12 would be "efghij"; and so on. The fact of transition from predictions based on observed data to as yet unobserved place fillers could be marked by storing the character as a negative number or by finding the trigram in the frequency table.

Predictions of the soft keyboard input device 100 could be improved by providing specialized prediction tables 144 adapted to the position of a character in a word. A preferred embodiment has four such prediction tables 144.

A first specialized prediction table would be consulted to predict the first character of a word. The structure of the first specialized prediction table would be a one-dimensional 26 element array of characters. The trigram index of the first prediction table is the position of any given character in order of declining likelihood. For example, the three characters most likely to occur at the beginning of a word would be stored at locations 1, 2 and 3, respectively.

A second specialized prediction table would be consulted to predict the second character of a word. The structure of the second specialized prediction table would be a 26×26 element array of characters. The trigram index for the second prediction table is made up of two indices. The first index is the position of the first character of a word in an alphabetical ordering. The second index is the position of any given character in order of declining likelihood of its occurrence as the second character of a word. For example, the three characters most likely to occur as the second character of a word starting with "t" would be stored at locations 20,1; 20,2; and 20,3, respectively.

A third specialized prediction table would be consulted to predict the third character of a word. The structure and trigram indices of the third specialized prediction table are the same as those for the general prediction tables 144 described above.

A fourth specialized prediction table would be consulted to predict a character not occurring as the first, second, or third character of a word. The structure and trigram indices of the fourth prediction table are the same as those for the general predication tables 144 described above.

Implementation of specialized prediction tables for predictions beyond the third character of words, including those necessary to produce multi-character displays of full and partial words appearing in the box 40 in FIG. 6 would be obvious to one of skill in the art.

Additionally, there can be punctuation prediction numeric prediction tables associated with each software application. The structure and trigram indices for the punctuation and numeric prediction tables are the same as those for the first specialized prediction table. The punctuation prediction table contains punctuation marks and control characters such as a period 67 and a capital "CAP" 66 in FIG. 6. Other controls and punctuation symbols will appear in boxes 66 and 67 depending on their likelihood of occurrence. The numeric prediction table contains the numerals "0" through "9" and mathematical symbols such as "+" and "−". The same techniques applied to letters of the alphabet in connection with the illustrated word processing application, can be applied to numerals in a mathematically oriented application such as a spread sheet program.

The frequency tables 142 are written to at appropriate times by the real time data collection buffer 132. Accordingly, the structure of the frequency tables 142 facilitates indexing by trigram and frequency modification of the number of times trigrams have occurred. The prediction tables 144, on the other hand, are continually accessed by the prediction server 126. Accordingly, the data structure of the prediction tables 144 facilitates determining the character which has occurred with a specified relative frequency after a given two-character sequence. The frequency to batch processor 134 bridges the gap between the two data structures.

The frequency to batch processor 134 updates the prediction tables 144 using the data in the frequency tables 142 as follows. First, it reads a block of one of the frequency tables 142 from the non-volatile on-line storage device 130 (via a data path 176). The entries of the frequency table block are then sorted so that their frequency fields are in descending order. Associated with each of the entries is the third character of the trigram which the entry represents. The third characters of the trigram fields are written to the prediction block of the prediction table associated with the same software application and the same first and second index as the frequency table block. The characters are written in the sorted order. In other words, they are written so that the characters in the prediction block are in order of declining likelihood.

If a trigram has not occurred in the source text, there will be no entry for it in the frequency table block. Accordingly, the frequency-to-prediction batch processor 134 then determines the characters for which there were no entries in the frequency table block, sorts these characters so as to arrange them in alphabetical order (for example), and writes them (in order) to the prediction block (via the path 178). Therefore, in the prediction block the alphabetized characters immediately follow the characters written from the frequency table block.

5. Presenter Module

Figure 8A:
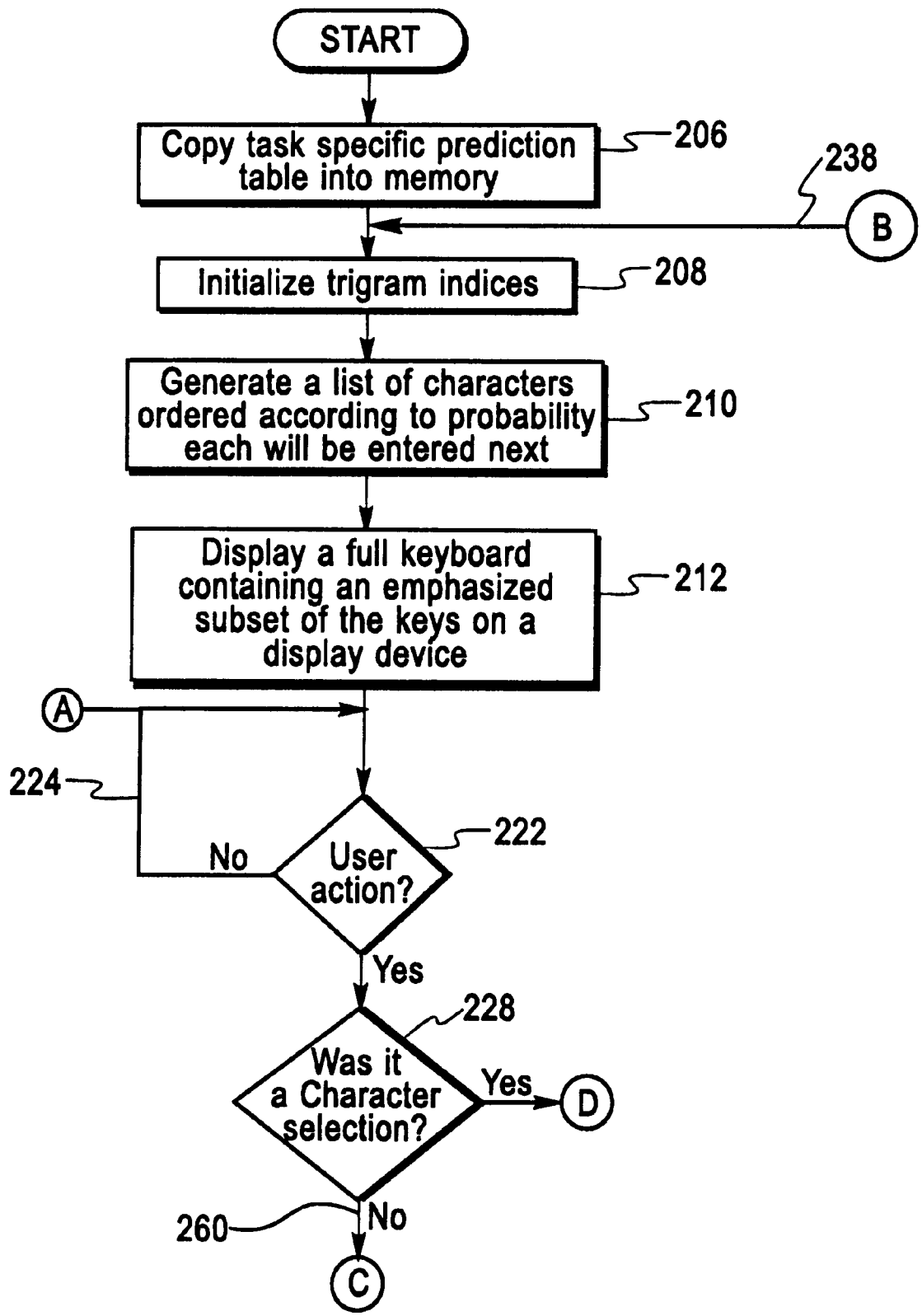
FIGS. 8a and 8b show a flow chart for the method of operation for the block diagram of FIG. 7.
Figure 8B:
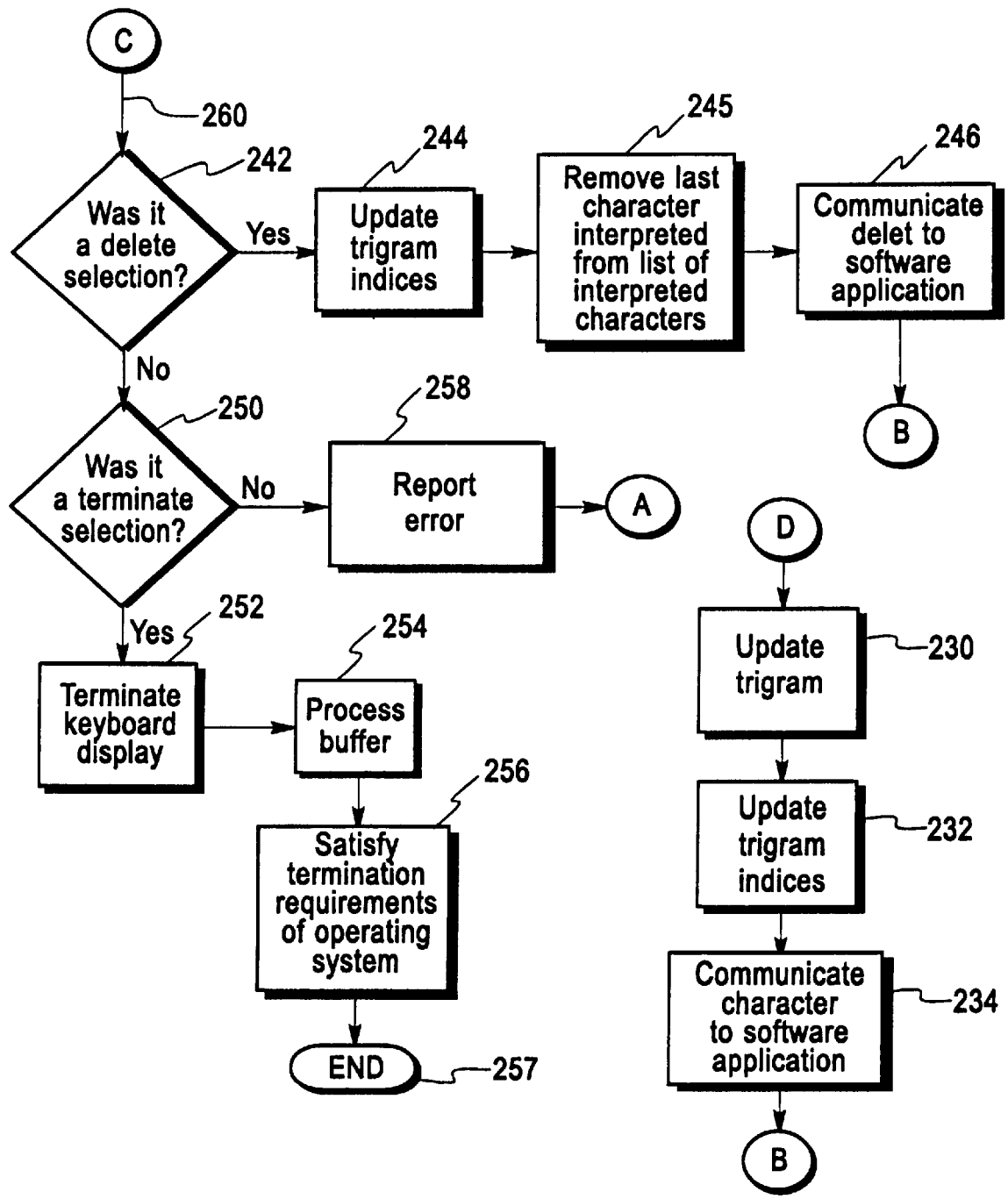

FIG. 8 shows a flow chart for the method of the presenter 108. The flow chart also illustrates the interaction of the modules of the soft keyboard input device 100.

At start-up, the prediction table 144 corresponding to the software application 124 in use is copied (via a data path 140) to the memory of the computer 104. (See step 206). The copy in the computer 104 is the task specific prediction table 128.

The keyboard display system 116 then requests the prediction server 126 (via a data path 168) to perform an initial prediction. The display system 116 generates such a request by setting the preceding sequence of trigram indices to the alphabetic positions of characters likely to precede the beginning of a sentence. (See step 208). Such characters could be, for example, "period blank" or "blank blank". For an implementation of the present invention which emphasizes n characters on the soft keyboard, the display system 116 could set the occurrence likelihoods of the trigram indices to the numbers 1 through n. A common value of n would be 6.

Next, the prediction server 126 accesses the task specific prediction table 128 (via data path 170) with the trigram indices set by the keyboard display system. The prediction server 126 thereby generates a list of characters ordered according to the probability that each will be entered next. (See step 210). The prediction server 126 sends these characters (called predicted characters) to the keyboard display system 116 (via a data path 152).

The keyboard display system 116 then generates a description of a full soft keyboard with the predicted characters emphasized as possible options for selection by the user 120. (See step 212.) Since there is a full keyboard, the user also has an option to select a desired character not presented as a possible option.

The windowing system 122 receives the soft keyboard description from the keyboard display system 116 (via a data path 154), converts the soft keyboard description into a screen presentation, and sends the screen presentation data to the display 156 via a data path 158.

The user 120 then selects an option for forming an appropriate action on the soft keyboard pointing device 164. If the user 120 is using a stylus, appropriate actions may include putting a stylus down on the symbolic representation of the desired option or moving the stylus to the option. If the user 120 is using a mouse, appropriate actions may include clicking on an option.

The windowing system 122 constantly monitors the pointing device 164 for a user selection action (step 222). When the user selects a character or the space character (see step 228), then the selection is passed to the keyboard display system 116 where the character is processed as follows. The keyboard display system 116 forms a trigram made up of the last three characters interpreted (see step 230), and communicates it to the real time data collection buffer 132 via the path 148. The keyboard display system 116 then updates the trigram indices by setting the first indices to what were formerly the second indices and setting the second indices to the alphabetic position of the interpreted character. The occurrence likelihoods remain the numbers 1 through n. (See step 232.) The keyboard display system 116 then sends the updated trigram indices to the prediction server 126 via the path 168.

Next, the character is sent from the keyboard display system 116 to the software application 124 (via the data path 177). (See step 234.) Alternatively, the keyboard display system 116 could send characters to the software application 124 through an interface such as a keyboard queue of the software application 124. Upon receiving a character from the keyboard display system 116, the software application 124 may use the windowing system 122 to display the character as part of some text in a text display area, such as the text space 32 in FIG. 3.

The user selection action may also be a command. Flow of control then returns to step 210, to consult the task specific prediction table 128 with the updated trigram indices. (See path 260.) If a selection is requested to delete the last character interpreted (see step 242), then processing is as follows. The keyboard display system 116 updates the preceding sequences of the trigram indices by setting the second indices to the first indices and setting the first indices to the value of the first indices before the last character was selected. (See step 244.) For example, if the last three characters selected were "t", "h" and "a", and the "a" were deleted, then the preceding sequences would be updated from the alphabetic positions of "h" and "a" to the alphabetic positions of "t" and "h". The occurrence frequencies would remain 1 through n. The entry analyzer 114 then sends the updated trigram indices to the prediction server 126.

The keyboard display system 116 maintains a list of characters most recently interpreted. Accordingly, the keyboard display system 116 then removes from this list the last character interpreted. (See step 245.)

The keyboard system 116 next sends a delete code to the windowing system 122. The windowing system 122 sends the delete code to the software application 124 (via the path 176). (See step 246.) Alternatively, the character could be deleted from the keyboard queue of the software application 124.

The software application 124 may then use the windowing system 122 to remove the character from the display 156. Alternatively, if the software application 124 had interpreted the character as a command, then it could undo the command. Flow of control then returns to step 210, which is explained above. (See path 238).

If a user action is interpreted as a request for the keyboard input device 100 to be terminated (see step 250), then the processing is as follows. The keyboard display system 116 signals the windowing system 122 (via the path 152 to the keyboard display system 116 and the path 154 to the windowing system 122) to remove the keyboard and the application window from the display 156. (See step 252.)

The keyboard display system 116 then informs the real time data collection buffer 132 (via the path 148) that is has received a termination action. The real time data collection buffer 132 then empties itself by updating the frequency table 142 associated with the currently running software application 124 (via the path 150). (See step 252.) Finally, the soft keyboard input device 100 satisfies any program termination requirements of the operating system. (See step 256.) Such requirements could include, for example, freeing any memory it has allocated. The soft keyboard input device 100 then ceases operation. (See step 257.)

If a user action is not a character selection, a delete selection or a terminate selection, then a software error is indicated (see step 258) and flow of control then returns to step 222.

5. Table Maintenance

The frequency-to-batch processor 134 maintains the prediction tables 144 using data in the frequency tables 142. FIGS. 9 and 10 show how this is done. Specifically, FIG. 9 shows an example of an initial frequency table block 410 and an initial prediction table block 412, and FIG. 10 shows a subsequent frequency table block 514 and a subsequent prediction table block 516. The table blocks shown are those associated with the sequence "un". It should be understood that the "un" blocks are preceded by the "um" blocks and followed by the "uo" blocks and so on.

Looking at the initial frequency table block 410, the number field of a "t" entry 420 is 3956, which is the number of times the sequence "unt" has occurred in the source text. The initial frequency table block 410 has no "z" entry. This indicates that the sequence "unz" has not occurred in the source text.

The frequency-to-prediction batch processor 134 generates the initial prediction table block 412 from the initial frequency table block 410. The second entry 422 of the initial "un" prediction table block 412 is "t" which indicates that "t" has occurred in the source text second most frequently after "un". A twenty-sixth entry 424 of the initial prediction table block 412 is "z". (The twenty-sixth entry 424 is the last entry of the table.) No frequency data exists at this point in the example for the trigram "unz". Accordingly, the "z" is among the characters at the end of the initial prediction table block 412 which are placed in alphabetical rather than frequency order.

Given the initial frequency table block 410 and the initial prediction table block 412 if the strings "count" "country"

and "funzap" were to occur in the source text, then the trigrams in these words would be added to the real-time data collection buffer 132. At some time in the operation of the soft keyboard input device 100, the real time data collection buffer 132 generates the subsequent frequency table block 514 from the combination of the real-time data it contains and the initial frequency table block 410.

The sequence "unt" occurs twice in the three words entered. Accordingly, the number field 418 of the "t" entry 420 of the subsequent frequency table block 514 has increased by two to 3958. The sequence "unz" occurs once in the three words entered. Accordingly, a "z" entry 526 is created for the subsequent frequency table block 514 with a number field 528 of one.

The process described above will accumulate models (expressed as trigram frequencies) of the user's vocabulary and usage for various software applications in the form of application-specific frequency tables. It is the job of the frequency-to-prediction batch processor 134 to convert these models into the prediction tables 144.

The frequency-to-prediction batch processor 134 is invoked on an available data and/or an available cycles basis. For example, it could be invoked nightly at a time when use of the computer 104 is low, and more often if the user 120 was rapidly entering data.

The general operation of the frequency-to-prediction batch processor 134 is explained above. The frequency-to-prediction batch processor 134 in this example amends the initial prediction table block 412 to obtain the subsequent frequency table block 514. As with the initial prediction table block 412, the second entry 432 of the subsequent prediction table block 516 is "t". This indicates that there is still exactly one character ("d") which has been encountered in the source text more often than "un" that "t".

The character "z" is a twenty-first entry 532 of the subsequent prediction table block 516. The "z" was moved up from the twenty-sixth entry 424 ahead of four characters ("j", "v" "x" and "y") which had still not been encountered after "un".

6. Character Prediction

What follows is an example of how the soft keyboard input device 100 would carry out the steps 212 and 248 of FIG. 8. In this example, the user 120 has just entered the string of characters, "coun". Step 212 is carried out as follows. The entry analyzer 114 sends the trigram indices for "u, n, 1" through "u, n, 6" to the prediction server 126. The prediction server 126 returns the first six entries of the task specific prediction table. The entries are characters "d", "t", "i", "c", "e" and "a", respectively. Six characters are selected in the embodiment of the invention because this is both a small enough number of characters for the user 120 to scan rapidly and is a large enough number for the probability of the selection containing the desired character to be high. In general, the number of characters returned will also be affected by the membership of the trigram in the frequency table and the associated frequency.

The keyboard display system 116 carries out the step 214 as follows. The keyboard display system 116 emphasizes the predicted characters, for instance in the manner shown in FIG. 2, by using larger, bolder characters set off in different shaped boxes 22.

Changing the emphasized letters involves steps 248 and 214 and is carried out on the example as follows. The keyboard display system 116 carries out the step 248 by adding 6 to each third index of the trigram indices to produce the trigram indices fox "u, n, 7" through "u, n, 12". In carrying out step 212, the action user sends the trigram indices to the prediction server 126. The prediction server 126 returns the seventh through twelfth entries of the task-specific prediction table segment 312. The entries are "s", "f", "n", "l", "p" and "g", respectively. The keyboard display system 116 carries out the step 214 by generating the prediction bar 314 with these characters in the character boxes 334, 336, 332, 338, 330 and 340, respectively.

It is important to understand that while the foregoing material has been described in terms of using a single task-specific table for generating next-character predictions, it is within the scope of this invention to use both multiple tables and multiple prediction methods. An example of use of multiple tables is described in detail above (in the section entitled "Data Manager").

Examples of other prediction methods could include language models that recognize when words have been formed so that word endings could be presented as options, as disclosed in connection with FIG. 3. A language model could also recognize the frequency with which whole words follow other words so that if a high probability word existed, the whole word could be presented as a selection along with letters or varying length parts of words. Such prediction methods are implemented by modifying the prediction tables 144 to include not only characters but also pointers to strings of characters.

It should be understood that alternative techniques to those disclosed herein can be used for changing emphasis and foreground-background relationships, and that any such techniques may be applied without departing from the spirit of this invention. Other choices may include variation in type face, color or 3-D effects to bring the emphasized letters to the foreground. In addition, while six keys have typically been emphasized in this example, the choice of the number emphasized, the gradations of emphasis, and the means of emphasis, and the keyboard layout, can be varied in a manner which depends on the context in which the invention is applied. Therefore, while the invention has been particularly shown and described with reference to preferred embodiments thereof, it will be understood by those skilled in the art that various changes in form and details may be made therein without departing from the spirit and scope of the invention.

Having thus described our invention, what we claim as new is:

1. A method for generating a word for display on a screen comprising:
   a) displaying for selection a fixed set of characters on the screen;
   b) enhancing a subset of statistically most likely to be selected ones of said fixed set of characters, the subset being fewer than the full fixed set of characters;
   c) selecting any one of the fixed set of characters whether or not it is in the enhanced subset if it is a desired character;
   d) refreshing the fixed set of characters including an enhanced subset of statistically next most likely characters to be selected after the selection of the desired character;
   e) repeating steps c) and d) if an additional character is desired; and
   f) selecting the position of a mouse cursor based on a weighted average of the possibility of selection of at least two of the characters of the subset.

2. The method of claim 1 including the step of: displaying the set of characters in a keyboard format.

3. The method of claim 2 including the steps of: using a pointing device for selection of the characters.

4. The method of claim 1 including the step of:
clustering for selection additional copies of characters from the subset of statistically likely to be selected characters in the proximity of the most likely character to be selected from the subset of statistically most likely characters.

5. The method of claim 1 including the step of:
clustering for selection additional copies of characters of the fixed set of characters around the most likely to be selected character.

6. The method of claim 1 including the step of:
clustering for selection additional characters from the subset of statistically likely characters to be selected in the proximity of the most likely to be selected character from the subset of statistically most likely characters.

7. The method of claim 5 including the step of:
placing for selection at least one statistically likely to be selected combination of characters adjacent the most likely character to be selected.

8. The method of claim 5 including the step of:
placing adjacent to the statistically most likely character to be selected a word likely to be selected.

9. The method of claim 4 including the step of:
providing for selection a column of words likely to be used with the statistically most likely to be selected character.

10. The method of claim 1 including using at least one of a variation in size, shape, color, intensity and type face to distinguish the subset of characters from other characters of the fixed set of characters.

11. The method of claim 10 including providing gradations in enhancement in characters in the subset depending on the order of likelihood of character selection.

12. Apparatus for generating characters of a soft keyboard for display for selection on a screen comprising:
   a) means for displaying a fixed set of individual characters of the soft keyboard on the screen for selection by a user of each character independently of any other character of the fixed set;
   b) means for changing the appearance of a subset of the most likely, to be selected ones of the full fixed set of individual characters;
   c) means to be used by a user for selecting any one of the fixed set of characters, whether or not it is in the enhanced subset, if it is a desired character;
   d) means for replacing at least one of the enhanced characters with a different character to form another enhanced subset statistically most likely characters to be selected that reflects said selection of a character by the user; and
   e) means for selecting by the user an additional character from fixed set whether or not it is part of said another subset.

13. The apparatus of claim 12 including:
means for placing for selection at least one statistically likely to be selected combination of characters adjacent the most likely character to be selected.

14. The apparatus of claim 12 including:
means for placing for selection a word likely to be selected beginning with the most likely character to be selected; next to the letter most likely to be selected.

15. The apparatus of claim 12 including:
displaying a column of likely to be selected words that begin with the letter most likely to be selected.

16. The apparatus of claim 12 wherein said means for enhancing the subset includes means for using at least one of a variation in size, shape, color intensity and type face to distinguish the appearance of the characters of the subset from the other characters of the fixed set.

17. A software product on a medium for generating a soft keyboard on a screen comprising:
   a) software code for displaying a fixed set of keys of the keyboard on the screen each key selectable independently of any other key of the fixed set to select the character represented by that key;
   b) software code for enhancing in the keyboard the appearance of an initial subset of statistically likely to be selected ones of said fixed set of keys to make the characters represented by those keys of the subset stand out from the other keys of the fixed set and thereby attract attention of a user to the characters represented by the subset, the subset being fewer than the full fixed set of keys;
   c) software code for selecting any one of the fixed set of keys whether or not it is in the enhanced subset if it is a desired key; and
   d) software code for changing the appearance of the fixed set of keys by enhancing a different enhanced subset of statistically likely to be selected keys after the selection of the desired key to make the characters represented by the different set stand out from all the other characters of the set to attract the attention of the user to the different characters represented by the different enhanced subset.

18. The software product of claim 17 including software code for displaying the set of keys in a standard keyboard layout.

19. The software product of claim 18 including software code responsive to the use of a pointing device for selection of the keys.

20. The software product of claim 17 including software code for clustering for selection additional copies of characters from the subset of statistically likely to be selected keys in the proximity of the key most likely to be selected from the displayed subset of statistically most likely keys.

21. The software product of claim 17 including software code for arranging for selection letters of said set of keys in a columnar format.

22. The software product of claim 17 including software code for clustering for selection additional copies of letters represented in the fixed set of keys around the most likely to be selected key.

23. The software product of claim 20 including software code for clustering for selection additional characters represented by the subset of statistically likely to be selected keys in the proximity of the most likely to be selected key from the subset of statistically most likely keys.

24. The software product of claim 21 including software code for placing for selection at least one statistically likely to be selected combination of letters adjacent the most likely key in the column to be selected.

25. The software product of claim 17 including software code for placing adjacent to the statistically most likely key to be selected a word likely to be selected.

26. The software product of claim 20 including software code for providing for selection a column of words likely to be used with the statistically most likely to be selected key.

27. The software product of claim 17 including software code for using at least one of a variation in size, shape, color, intensity and type face of the character to distinguish the initial and different subset of keys from other keys of the fixed set of keys.

28. The software product of claim 26 including software code for providing gradations in said variations in characters, in the subset depending on the order of likelihood of key selection.

29. The software product of claim 27 including software code for limiting enhancement of keys in the subset to those that exceed a threshold based on likelihood of being selected.

30. The software product of claim 20 including software code for placing the cursor in the proximity of the most likely to be selected key.

31. The software product of claim 20 including software code for selecting the position of a selection cursor based on a weighted average of the possibility of selection of at least two of the keys of the subset.

32. The software product of claim 20 including software code for basing the probability of selection of keys on at least the last two selections made by the user.

33. The software product of claim 32 including software code for taking into account for possibility of key selection the frequency of occurrence in a large body of text of sets of three or more characters.

34. A method for generating keyboard display on a computer screen for preparation of text by a computer user comprising:
 a) displaying for selection a fixed set of characters on the screen;
 b) enhancing a subset of statistically most likely to be selected ones of said fixed set of characters, the subset being fewer than the full fixed set of characters chosen by taking into account the frequency of selection of characters in a large body of text of sets of three or more characters from the fixed set;
 c) permitting the selection by the user of any one of the fixed set of characters whether or not it is in the enhanced subset if it is a desired character; and
 d) providing for the substitution of a different enhanced subset of statistically most likely characters to be selected after the selection of the desired character which set of characters is based on taking into account the comparison of the sets of the three or more characters of the fixed set including at least the last two selections of characters by the user.

35. The method of claim 34 including the step of:
 arranging for selection letters of said set of characters in a columnar format.

36. The method of claim 35 including the step of:
 clustering for selection additional characters from the subset of statistically likely characters to be selected in the proximity of the most likely to be selected character from the subset of statistically most likely characters.

37. The method of claim 35 including the step of:
 placing for selection at least one additional statistically likely to be selected character adjacent the most likely character to be selected.

38. The method of claim 34 including using at least one of a variation in size, shape, color, intensity and type face to distinguish the subset of characters from other characters of the fixed set of characters.

39. The method of claim 37 including providing gradations in enhancement in characters in the subset depending on the statistical likelihood of character selection.

40. The method of claim 38 including placing the cursor in the proximity of the most likely to be selected character.

* * * * *